(12) United States Patent
Boulet et al.

(10) Patent No.: US 9,097,307 B2
(45) Date of Patent: Aug. 4, 2015

(54) CONNECTING ROD INCORPORATING AN ENERGY ABSORBER

(71) Applicant: Airbus Operations SAS, Toulouse (FR)

(72) Inventors: Nicolas Boulet, Colomiers (FR); Laurent Barizza, Plaisance du Touch (FR)

(73) Assignee: Airbus Operations SAS, Toulouse (FR)

( * ) Notice: Subject to any disclaimer, the term of this patent is extended or adjusted under 35 U.S.C. 154(b) by 30 days.

(21) Appl. No.: 13/927,303

(22) Filed: Jun. 26, 2013

(65) Prior Publication Data

US 2014/0000999 A1   Jan. 2, 2014

(30) Foreign Application Priority Data

Jul. 2, 2012 (FR) ..................... 12 56318

(51) Int. Cl.
*F16F 7/12* (2006.01)
*B64D 27/26* (2006.01)
*B64C 1/06* (2006.01)
*F16F 1/00* (2006.01)
*F16F 9/00* (2006.01)
*F16F 9/32* (2006.01)
*F16F 9/58* (2006.01)

(52) U.S. Cl.
CPC . *F16F 7/12* (2013.01); *B64C 1/062* (2013.01); *B64D 27/26* (2013.01); *B64D 2027/268* (2013.01); *F16F 9/003* (2013.01); *F16F 9/3207* (2013.01); *F16F 9/58* (2013.01)

(58) Field of Classification Search
CPC ............. F16F 7/12; F16F 7/123; F16F 7/128; F16F 9/003; F16F 9/3207; F16F 9/346; F16F 9/36; F16F 9/54; F16F 9/58

USPC ............ 188/371, 377; 267/70, 71, 72, 73, 74; 166/242.7, 381, 169, 178

See application file for complete search history.

(56) References Cited

U.S. PATENT DOCUMENTS 801,722 A * 10/1905 Lane ............................... 267/71
3,554,387 A * 1/1971 Thornhill et al. ............. 213/223

(Continued)

FOREIGN PATENT DOCUMENTS

| EP | 1291545 | 3/2003 |
|---|---|---|
| EP | 1857342 | 11/2007 |

OTHER PUBLICATIONS

French Search Report, Mar. 6, 2013.

*Primary Examiner* — Melody Burch
(74) *Attorney, Agent, or Firm* — Greer, Burns & Crain, Ltd.

(57) ABSTRACT

A connecting rod including two non-connected rod elements coaxial with a longitudinal axis which are offset along the longitudinal axis, and an energy-absorption device that absorbs energy by plastic deformation. The energy-absorption device includes a coaxial hollow tube with a wall which deforms plastically when subjected to an axial compressive force exceeding a certain threshold, a coaxial pin having ends immobilized with respect to the rod elements in the event of tensile forces, and a sleeve fitting over the two facing ends of the rod elements which are positioned one on each side of the energy-absorption device, the sleeve being slidable with respect to one rod element in order to allow the hollow tube and/or the pin to deform and absorb energy. The sleeve limits a range of deformation so that a breaking point of the energy-absorption device is not reached.

6 Claims, 3 Drawing Sheets

(56) References Cited

U.S. PATENT DOCUMENTS

| | | | |
|---|---|---|---|
| 4,361,212 A * | 11/1982 | Bolang et al. | 188/377 |
| 4,456,233 A * | 6/1984 | Muller | 267/70 |
| 5,299,667 A * | 4/1994 | Hammond | 188/218 XL |
| 6,679,480 B1 * | 1/2004 | Hara et al. | 256/47 |
| 8,109,171 B2 * | 2/2012 | Nakao et al. | 74/490.03 |
| 2003/0057318 A1 | 3/2003 | Struzik et al. | |

* cited by examiner

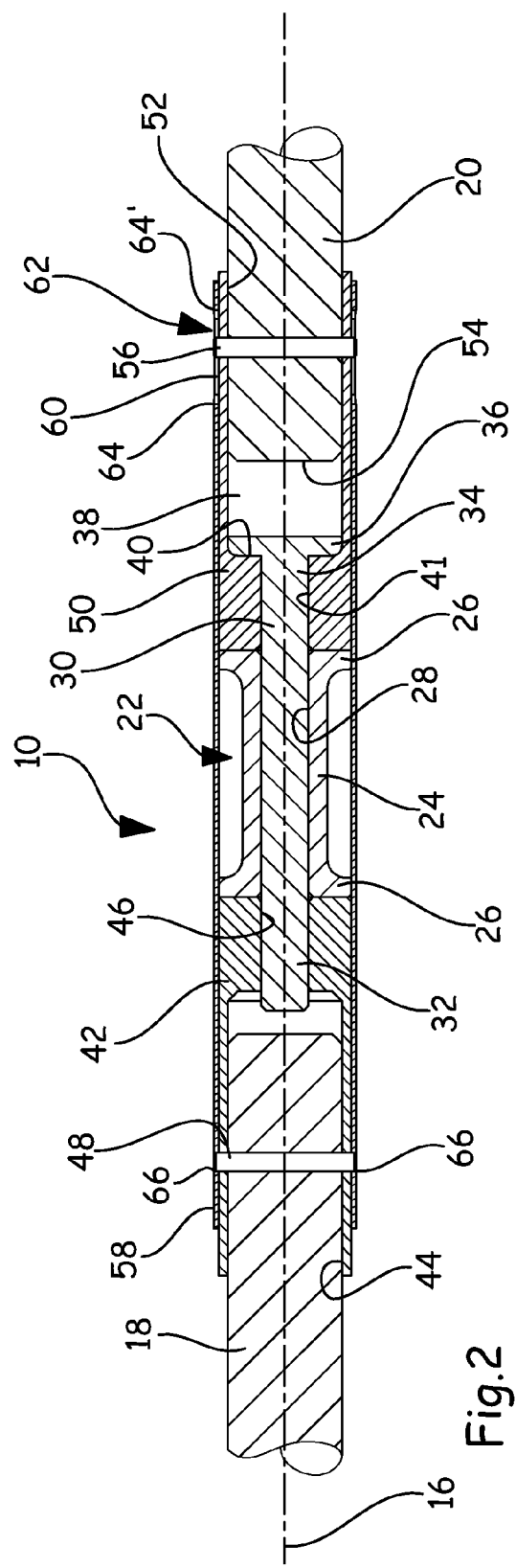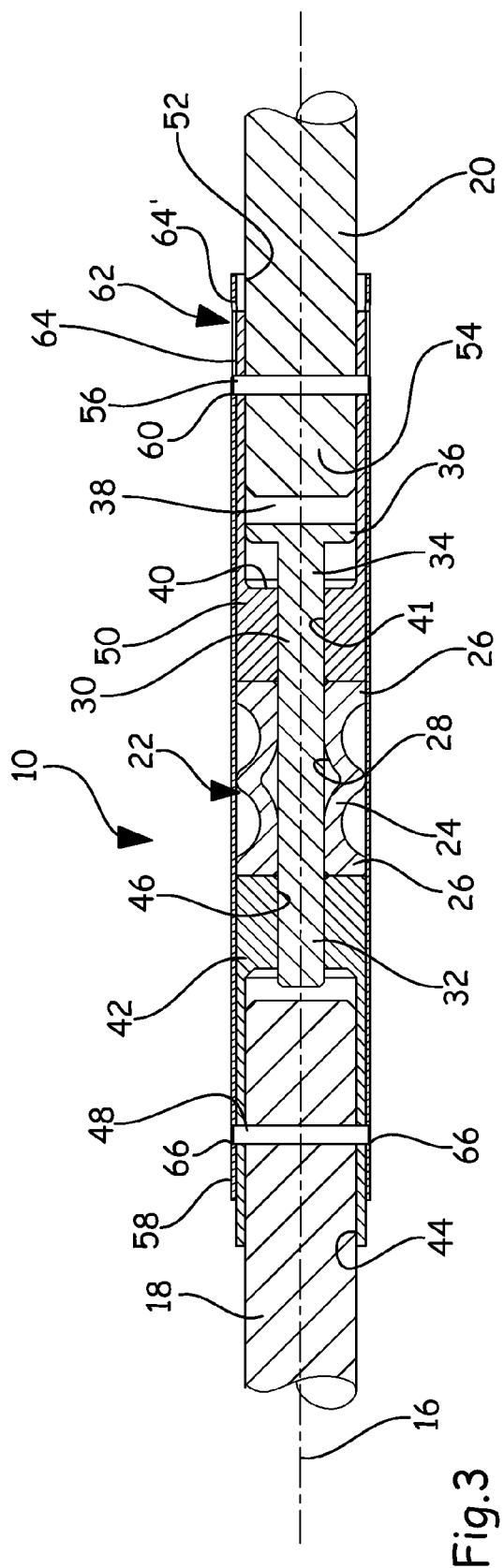

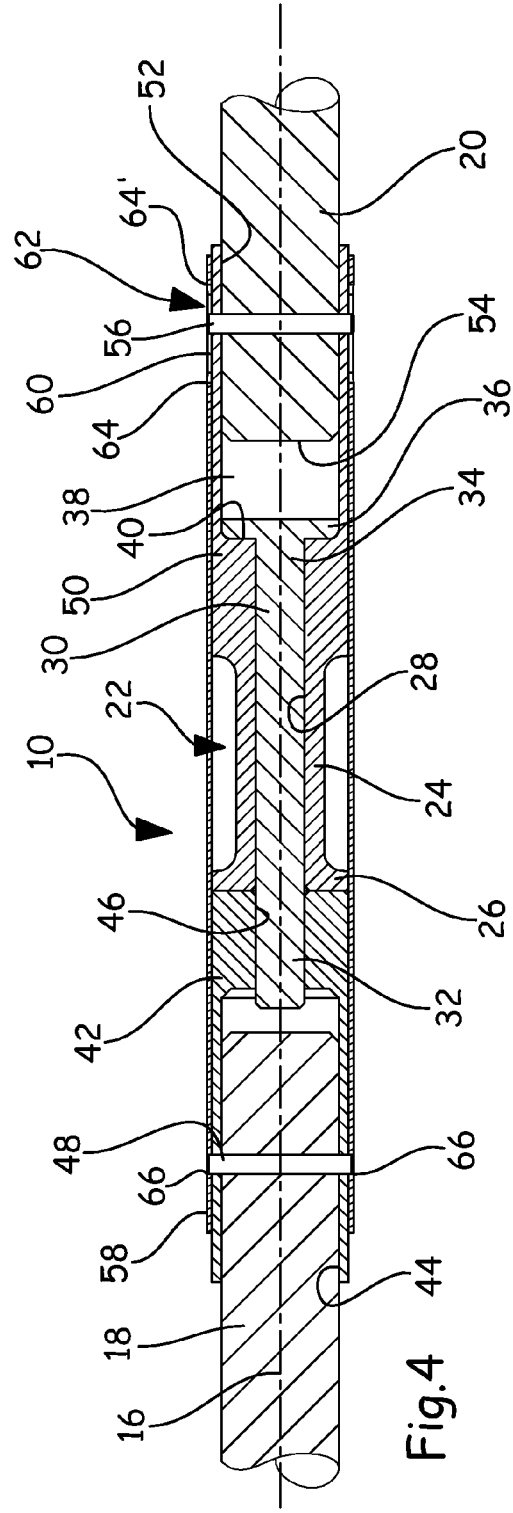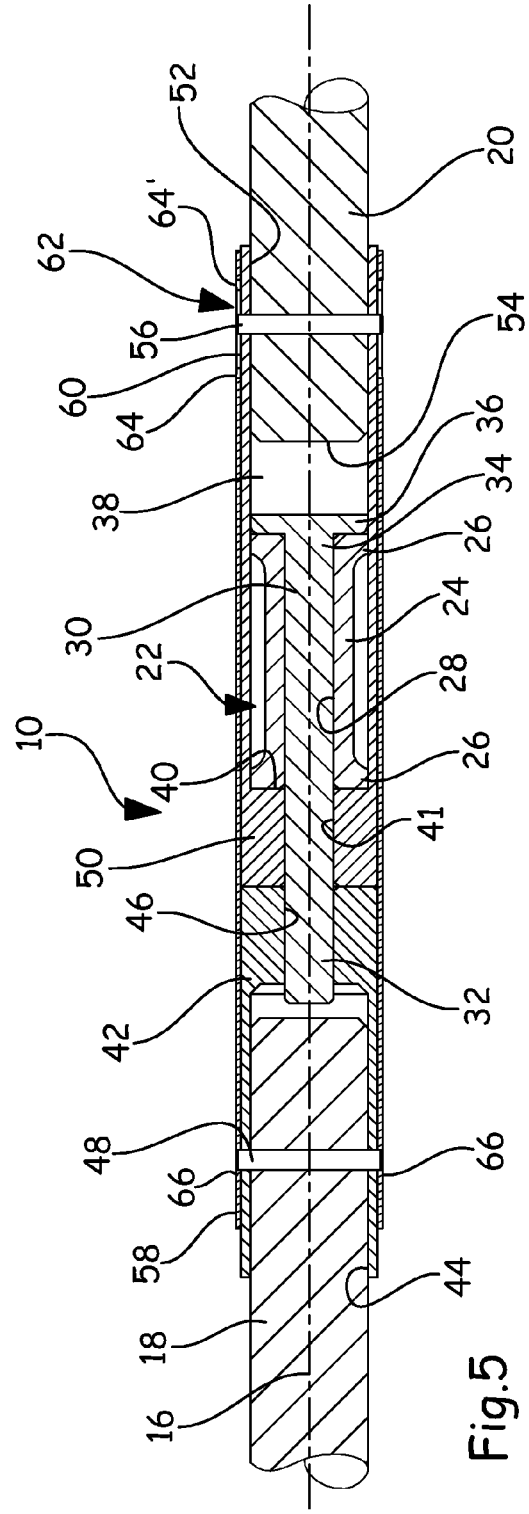

CONNECTING ROD INCORPORATING AN ENERGY ABSORBER

CROSS-REFERENCES TO RELATED APPLICATIONS

This application claims the benefit of the French patent application No. 12 56318 filed on Jul. 2, 2012, the entire disclosures of which are incorporated herein by way of reference.

BACKGROUND OF THE INVENTION

The present invention relates to a connecting rod incorporating an energy absorber.

Many connecting rods are used in an aircraft to connect two parts and allow force to be transmitted between the two connected parts. These connecting rods may be made of metal or of composite.

In the known way, a connecting rod comprises a longilinear body, for example, cylindrical, with, at each end, a head that allows the connecting rod to be connected to an element.

From a functional standpoint, a connecting rod allows two elements to be connected while maintaining a constant distance between them and allowing force to be transmitted between the two connected elements.

Connecting rods are engineered to react forces during normal operation and also in the event of accidental dynamic loading. In the latter instance, a connecting rod does not filter out some of the energy but transmits it in full from one end to the other which means that the elements connected need to have a structure that is reinforced in the region of the connection to the connecting rod. This reinforcing of the structure leads to an increase in the amount of weight carried and therefore to an increase in the energy consumption of the aircraft.

By way of example, an aircraft engine fan is positioned in a duct connected to the rest of the structure of the nacelle by a number of connecting rods referred to as thrust rods, illustrated for example in document FR-2,806,699. Should a fan blade break, the energy stored by the blade tends to deform the duct and to spread towards the structure of the nacelle along the connecting rods.

Depending on the material used, a connecting rod can deform in the plastic domain in buckling and absorb some of the energy in the event of accidental dynamic loading.

While this type of energy absorption is possible with metal connecting rods, it is not possible in connecting rods made of composite material which are unable to deform in the plastic domain in buckling.

In addition, although this type of deformation in the plastic domain in buckling is possible when the connecting rods are made of metal, it causes a significant relative movement between the heads of the connecting rod and this is generally detrimental to the structure of the nacelle or of the aircraft.

SUMMARY OF THE INVENTION

Hence, the present invention seeks to remedy the disadvantages of the prior art by proposing a connecting rod with an energy absorber that makes it possible to limit the spread of at least a significant portion of the energy.

To this end, the subject of the present invention is a connecting rod comprising two rod elements which are coaxial with a longitudinal axis, are non-connected and are offset along the longitudinal axis, and an energy-absorption means that absorbs energy by plastic deformation, characterized in that the energy-absorption means comprises:

a hollow tube with an axis coaxial with a longitudinal axis and the wall of which is able to deform plastically in buckling when the hollow tube is subjected to a compressive force directed in the direction of the longitudinal axis, and exceeding a certain threshold, a pin, coaxial with the longitudinal axis, the ends of which are immobilized with respect to the rod elements in the event of tensile forces, a sleeve which fits over the two ends of the rod elements which are positioned one on each side of the energy-absorption means and which is able to slide with respect to one rod element in order to allow the hollow tube and/or the pin to deform and to act as an energy absorber, the said sleeve making it possible to limit the range of deformation so that the breaking point of the energy-absorption means is not reached.

Thanks to this design of the connecting rod, it is possible to limit the spread of energy.

BRIEF DESCRIPTION OF THE DRAWINGS

Other features and advantages will become apparent from the description of the invention which will follow, which description is given merely by way of example with reference to the attached drawings, in which:

FIG. 2 is a longitudinal section through a connecting rod according to the invention prior to deformation, FIG. 3 is a longitudinal section through the connecting rod illustrated in FIG. 2 after deformation, FIG. 4 is a longitudinal section through a connecting rod according to another variant of the invention, and FIG. 5 is a longitudinal section through a connecting rod according to another variant of the invention.

DETAILED DESCRIPTION OF THE PREFERRED EMBODIMENTS

Figure 1:
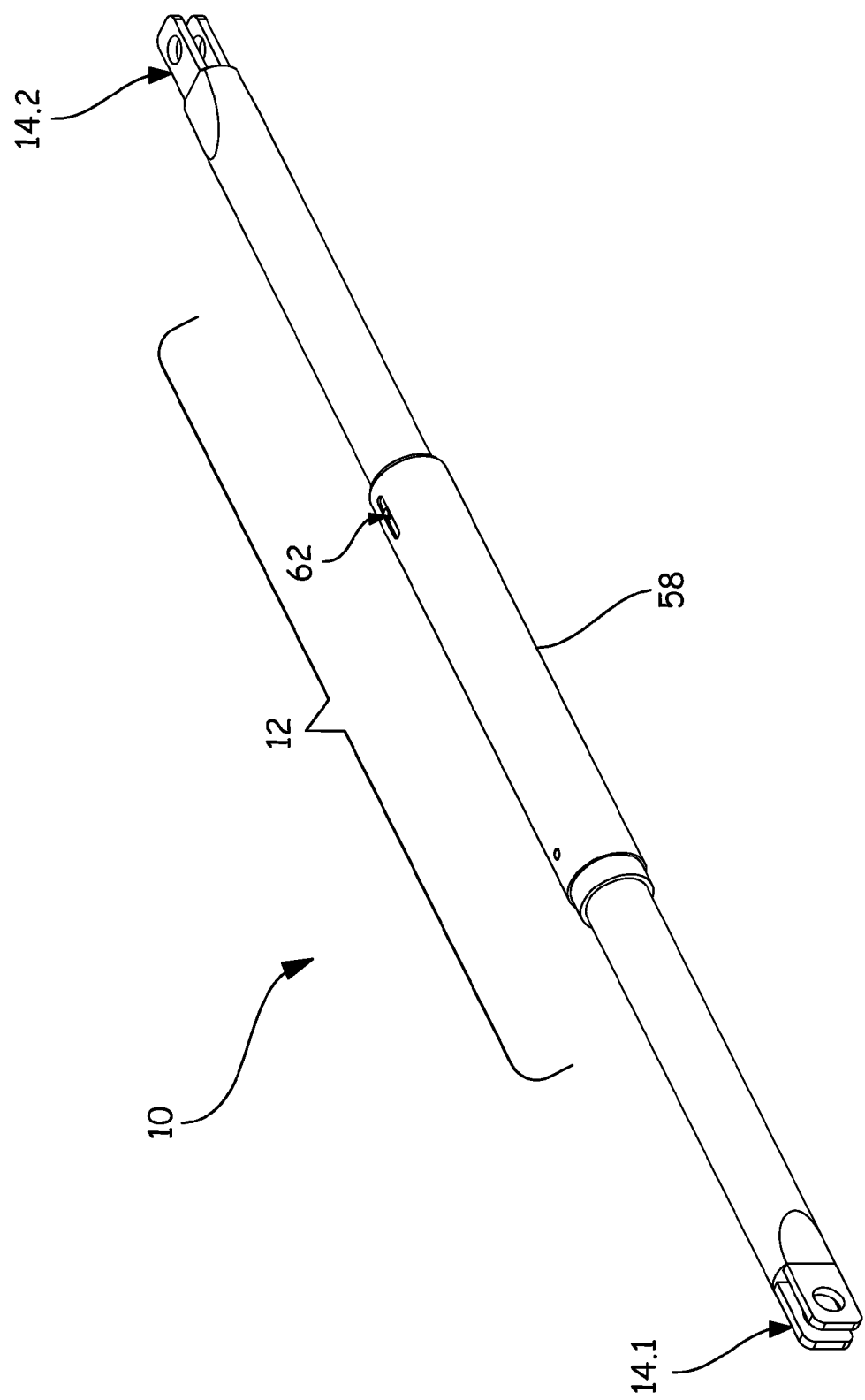
FIG. 1 is a perspective view of a connecting rod according to the invention.

FIG. 1 depicts as 10 a connecting rod with a longilinear central part 12 having at each of its ends, a head 14.1 or 14.2 that provides the connection between the connecting rod 10 and an element that has not been depicted.

The connecting rod may or may not be adjustable for length, depending on the circumstances.

The heads 14.1 and 14.2 of the connecting rod and any length-adjustment means that might be present are not described further because these are known to the person skilled in the art.

In the remainder of the description, the longitudinal direction means the direction corresponding to the longest dimension of the connecting rod. In FIGS. 2 to 5 it corresponds to the longitudinal axis reference 16.

A longitudinal plane contains the longitudinal direction whereas a transverse plane is perpendicular to the said longitudinal direction. A radial direction is perpendicular to the longitudinal direction.

The connecting rod 10 comprises a first rod element 18 connected to the first head 14.1 and a second rod element 20 connected to the second head 14.2, the two rod elements 18 and 20 being coaxial with the longitudinal axis 16, non-connected and offset along the longitudinal axis 16. These rod elements 18 and 20 may be made of a composite material.

According to one specific feature of the invention, the connecting rod comprises an energy-absorption means 22 that absorbs energy by plastic deformation and is interposed between the two rod elements 18 and 20. This energy-absorption means 22 comprises a hollow tube 24 with an axis coaxial with the longitudinal axis 16. The material used for the hollow tube 24, the wall thickness of the hollow tube 24 and the diameter thereof are tailored so that the wall of the hollow tube buckles when the hollow tube is subjected to a compressive force directed in the direction of the longitudinal axis 16, that exceeds a certain threshold.

In the remainder of the description, compressive forces mean forces parallel to the longitudinal axis 16 and directed towards one another. Tensile forces mean forces parallel to the longitudinal axis 16 and directed in such a way as to stretch the connecting rod.

When the compressive forces experienced by the hollow tube 24 are below a given threshold, the hollow tube 24 does not deform. When the connecting rod experiences a dynamic load which induces compressive forces on the hollow tube that exceed the given threshold, the hollow tube 24 deforms in the plastic domain and absorbs some of the energy produced by the compressive forces.

As it deforms, the diameter of the median part of the wall of the hollow tube 24 tends to expand in a transverse plane and the ends of the hollow tube tend to move closer together in the longitudinal direction, as illustrated in FIG. 3.

Unlike in the prior art, the absorption of energy gives rise to only a small relative movement between the two heads which movement is not detrimental to the structure of the aircraft incorporating such a connecting rod.

According to another advantage, a connecting rod, the rod elements 18 and 20 of which are made of composite, can act as an energy absorber if an energy-absorption means 22 according to the invention is incorporated.

For preference, the hollow tube 24 works in compression then in buckling. The material is chosen to achieve a compromise between the elastic limit in compression, the elastic limit at breakage and price. According to one embodiment, the hollow tube 24 is made of steel type E-Z5CNU15-05 (15-5PH).

The length of the hollow tube 24 may be tailored notably according to the amount of energy absorption required. In addition, the wall of the hollow tube may have shapes or machining that allow the hollow tube to deform in a wave (or a ripple) as illustrated in FIG. 3, or in several waves (several ripples) depending notably on the amount of energy that is to be absorbed.

For preference, the hollow tube 24 has a flange 26 at each end. Thus, the hollow tube 24 comprises a bore 28 with a constant inside diameter extending in the longitudinal direction and passing right through it. On the outside, the tube has an outside diameter De over its length with the exception of the flanges 26 the outside diameter Dc of which is greater than De. The flanges 26 allow better reaction of force by increasing the cross section of the ends of the hollow tube 24.

Advantageously, the energy-absorption means 22 comprises a pin 30, coaxial with the longitudinal axis 16 on which the hollow tube 24 is mounted, it being possible for the pin 30 to move in a translational movement in the direction of the longitudinal axis with respect to at least one of the two rod elements 18, 20. This pin allows the hollow tube 24 to be centered with respect to the said rod elements 18 and 20.

According to one embodiment, the outside diameter of the pin 30 is substantially equal, disregarding clearances, to the inside diameter of the hollow tube 24. This arrangement allows the hollow tube to be kept coaxial with the longitudinal axis 16.

The pin 30 extends all the way through the hollow tube 24 so that one of its ends 32 collaborates with the rod element 18 while the other end 34 collaborates with the rod element 20.

According to one feature of the invention, the pin 30 acts as an energy absorber in the event of dynamic loadings producing tensile forces.

In this variant, one of the ends 32 of the pin 30 is secured to one rod element 18. In one embodiment, the end 32 of the pin 30 is threaded and screws into a tapped hole secured to the rod element 18.

To complement this, the other end of the pin 30 comprises a head 36 the diameter of which is greater than the diameter Da of the pin 30 and able to be accommodated in a cylindrical cavity 38 secured to the second rod element 20, coaxial with the longitudinal axis 16, the inside diameter of which cavity is slightly greater than the diameter of the head 36. This cylindrical cavity 38 comprises at least one terminal face 40 perpendicular to the longitudinal axis 16, directed towards the first rod element 18, said cavity being extended in the direction of the first rod element 18 by a passage 41 the inside diameter of which is matched, disregarding clearances, to the diameter Da of the pin 30 and less than the diameter of the head 36. In the non-deformed state the head 36 bears against the terminal face 40. In the event of tensile forces, the two ends of the pin 30 are immobilized with respect to the rod elements 18 and 20 so that the pin has a tendency to be stretched.

In this variant, as illustrated in FIGS. 2 to 4, the hollow tube 24 is interposed between the ends of the rod elements 18 and 20. In this case, the absorption means 22 is a two-way means and absorbs both compressive forces via the hollow tube 24 and tensile forces via the pin 30.

The pin 30 is engineered and made from a material that allows it to deform plastically as it lengthens.

For preference, the pin 30 is made of a material which has an elongation at breakage of between 10 and 40% depending on the material used and on the stated requirement.

According to one embodiment, the pin 30 is made of a material marketed under the trade name Nimonic.

According to another variant illustrated in FIG. 5, the hollow tube 24 may be positioned between the head 36 of the pin 30 and the terminal face 40 of the cylindrical cavity 38. In that case, because the pin 30 is secured to the first rod element 18, the absorption means 22 is a one-way means and absorbs only tensile forces.

The two-way variant is favored because connecting rods are generally dynamically stressed with oscillatory phenomena which have a tendency initially to generate compressive forces and then to generate tensile forces.

Advantageously, at least one of the two rod elements 18, 20 of the connecting rod comprises a means of connection to the absorption means 22.

According to one embodiment, the first rod element 18 comprises an end-piece 42 that provides the connection between the rod element 18 and the energy-absorption means 22. This end-piece 42 of cylindrical shape comprises at a first end a cylindrical housing 44 the inside diameter of which is matched, disregarding assembly clearances, to the outside diameter of the first rod element 18 and, at the other end, a tapped hole 46 into which the pin 30 can be screwed. The connection between the end-piece 42 and the rod element 18 is provided by any suitable means, notably using a stop pin 48 arranged in a transverse plane which passes through the end-piece 42 and the rod element 18.

According to one embodiment, the second rod element 20 comprises an end-piece 50 providing the connection between the energy-absorption means 22 and the second rod element 20.

This end-piece 50 of cylindrical shape comprises at a first end a cylindrical housing 52 the inside diameter of which is matched, disregarding the assembly clearances, to the outside diameter of the second rod element 20. This housing 52 has a closed end perpendicular to the longitudinal axis 16 (which corresponds to the terminal face 40 of the cylindrical cavity 38) and which is distant from the end 54 of the second rod element 20 so as to delimit the cylindrical cavity 38. The end-piece 50 also comprises a passage 41 through which the pin 30 can pass.

The connection between the end-piece 50 and the rod element 20 is afforded by any suitable means, notably using a stop pin 56 arranged in a transverse plane which passes through the end-piece 50 and the rod element 20.

According to the variant illustrated in FIGS. 2 to 3, the hollow tube 24 and the end-piece 50 may be two separate components. According to the variant illustrated in FIG. 4, the hollow tube 24 and the end-piece 50 can be one single component.

According to one feature of invention, the connecting rod comprises a sleeve 58 which fits over the two ends of the rod elements 18 and 20 which are positioned one on each side of the energy-absorption means 22, more specifically over the end-pieces 42 and 50 in order to join these together.

This sleeve 58 makes it possible to obtain a surface that is approximately cylindrical.

According to one embodiment, the sleeve 58 has an inside diameter equal, disregarding assembly clearances, to the outside diameter of the end-pieces. This arrangement makes it possible to limit the risks of the rod elements and of their end-fittings deforming in buckling in the region of the energy-absorption means 22.

According to one feature of the invention, the sleeve 58 can slide with respect to a rod element or with respect to an end-piece (the end-piece 50 according to the example illustrated) so as to allow the hollow tube 24 and/or the pin 30 to deform and act as an energy absorber. Advantageously, the translational travel of the sleeve 58 with respect to the end-piece 50 is limited. According to one embodiment, the sleeve 58 comprises an oblong hole 60 capable of accommodating an end stop 62 secured to the end-piece 50 or to the rod element 20 with respect to which the sleeve 58 can slide. Thus, this end stop 62 makes it possible to limit the plastic deformation of the energy-absorption means 22 before it breaks by bearing against one of the ends 64 or 64' of the oblong hole 60. The dimensions of the oblong hole and, more particularly, the length thereof and the position of the end stop 62 with respect to the ends 64, 64' are determined according to the absorption capability of the energy-absorption means and according to the direction of the energy that is to be absorbed.

In the case of a two-way energy-absorption means 22, the end stop 62 is positioned at equal distances from the ends 64 and 64'.

According to one embodiment, the sleeve comprises two oblong holes 60 arranged symmetrically and in which the ends of the stop pin 56 which act as end stops 62 can be accommodated. To hold the sleeve 58 in place with respect to the other end-piece 42, the sleeve 58 comprises two cylindrical holes 66 in which the ends of the stop pin 48 can be accommodated, the cylindrical holes 66 having a diameter equal, disregarding assembly clearances, to that of the stop pin 48.

Advantageously, the connecting rod comprises means to encourage sliding between the component parts capable of sliding relative to one another, such as the pin 30 with respect to the end-piece 50 and the sleeve 58 with respect to the end-piece 50. According to one embodiment, self-lubricating bushings are interposed between those component parts which slide relative to one another.

The assembling of the connecting rod is now described.

The end-piece 50 and the hollow tube 24 are slipped over the pin 30, the head 36 of the pin being positioned in the housing 52 of the end-piece. Next, the end 32 of the pin 30 is screwed into the tapped hole 46 of the end-piece 42.

The sleeve 58 is fitted over the end-pieces 42 and 50. Next, the end of the first rod element is introduced into the housing 44 of the end-piece 42 then the stop pin 48 is fitted. The end of the second rod element 20 is introduced into the housing 52 in the end-piece 50 then the stop pin 56 is fitted taking care to position it at equal distances from the ends 64, 64' of the oblong hole 60.

As indicated earlier, the dimensions, shapes and material of the hollow tube 24 are determined according to the maximum compressive load that the connecting rod can withstand.

In the case of a two-way energy-absorption system, the dimensions, shapes and material of the pin 30 are determined according to the maximum tensile loading that the connecting rod can withstand.

The length of the oblong hole 60 and the position of the end stop 62 with respect to the ends of the oblong hole are determined in such a way as to allow relative movement between the two rod elements and plastic deformation of the hollow tube 24 and/or of the pin 30.

To prevent the energy-absorption means 22 from breaking, the end stop 62, the sleeve 58 and more particularly the thickness thereof, and the dimension of the oblong hole 60 are determined in such a way as to ensure that the forces can be reacted and breakage of the absorption means 22 avoided.

If the connecting rod is subjected to dynamic compressive loading, the rod elements 18 and 20 will move closer together and compress the hollow tube 24. The latter will deform plastically and thus absorb some of the energy so that not all of the energy will be transmitted from one end to the other.

In the event of dynamic loading of oscillating type (reverse cycle compressive/tensile loading), the rod elements 18 and 20 will first of all move closer together and compress the hollow tube 24, which will deform and absorb some of the energy. In a second phase, the rod elements 18 and 20 will tend to move apart and stretch the pin 30 which will deform and absorb some of the energy. Conversely, the dynamic loading may comprise a tensile phase followed by a compressive phase.

In either or both instances, the connecting rod comprises means in the form of at least one end stop 62 to limit the range of deformation so that the breaking point of the energy-absorption means (hollow tube 24 and/or pin 30) is not reached.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A connecting rod comprising two rod elements which are coaxial with a longitudinal axis, are non-contacting and are offset along the longitudinal axis, and an energy-absorption means that absorbs energy by plastic deformation, wherein the energy-absorption means comprises:

- a hollow tube with an axis coaxial with the longitudinal axis and with a wall which is able to deform plastically in buckling when the hollow tube is subjected to a compressive force directed in the direction of the longitudinal axis, and exceeding a certain threshold,
- a pin, coaxial with the longitudinal axis, each axial end of the pin being limited in displacement away from a respective one of the rod elements in the event of tensile forces applied to the connecting rod,
- a sleeve fitting over the two facing axial ends of the rod elements which are positioned one on each side of the energy-absorption means, the sleeve being able to slide with respect to one rod element in order to allow at least one of the hollow tube and the pin to deform and to act as an energy absorber, the sleeve making it possible to limit a range of deformation of the energy absorption means so that a breaking point of the energy-absorption means is not reached, wherein the sleeve comprises an oblong hole capable of accommodating an end stop secured to at least one of the two rod elements with respect to which the sleeve can slide.

2. The connecting rod according to claim 1, wherein the pin is able to deform plastically in the event of tensile forces applied to the connecting rod and directed in the direction of the longitudinal axis.

3. The connecting rod according to claim 1, wherein the pin comprises a first end secured to a first rod element and a second end with a head accommodated in a cylindrical cavity secured to the second rod element and extended in a direction of the first rod element by a passage to allow the pin to pass, the cavity having at least one terminal face directed towards the first rod element against which the head of the pin bears in a non-deformed state of the energy-absorption means.

4. The connecting rod according to claim 2, wherein the pin is made of a material which has an elongation at breakage of between 10 and 40%.

5. The connecting rod according to claim 1, wherein the hollow tube has a flange at each end.

6. The connecting rod according to claim 1, wherein the two rod elements comprise a first rod element and a second rod element; the connecting rod comprises an end-piece comprising a housing for the second rod element and a stop pin providing the connection between the end-piece and the second rod element, the end of the stop pin being accommodated in the oblong hole of the sleeve so as to act as the end stop.

* * * * *